Aug. 13, 1968   P. J. HUBBARD   3,396,680
THERMAL REACTORS

Filed Feb. 28, 1967   3 Sheets-Sheet 1

INVENTOR.
PETER J. HUBBARD
BY Arnold Grant
AGENT.

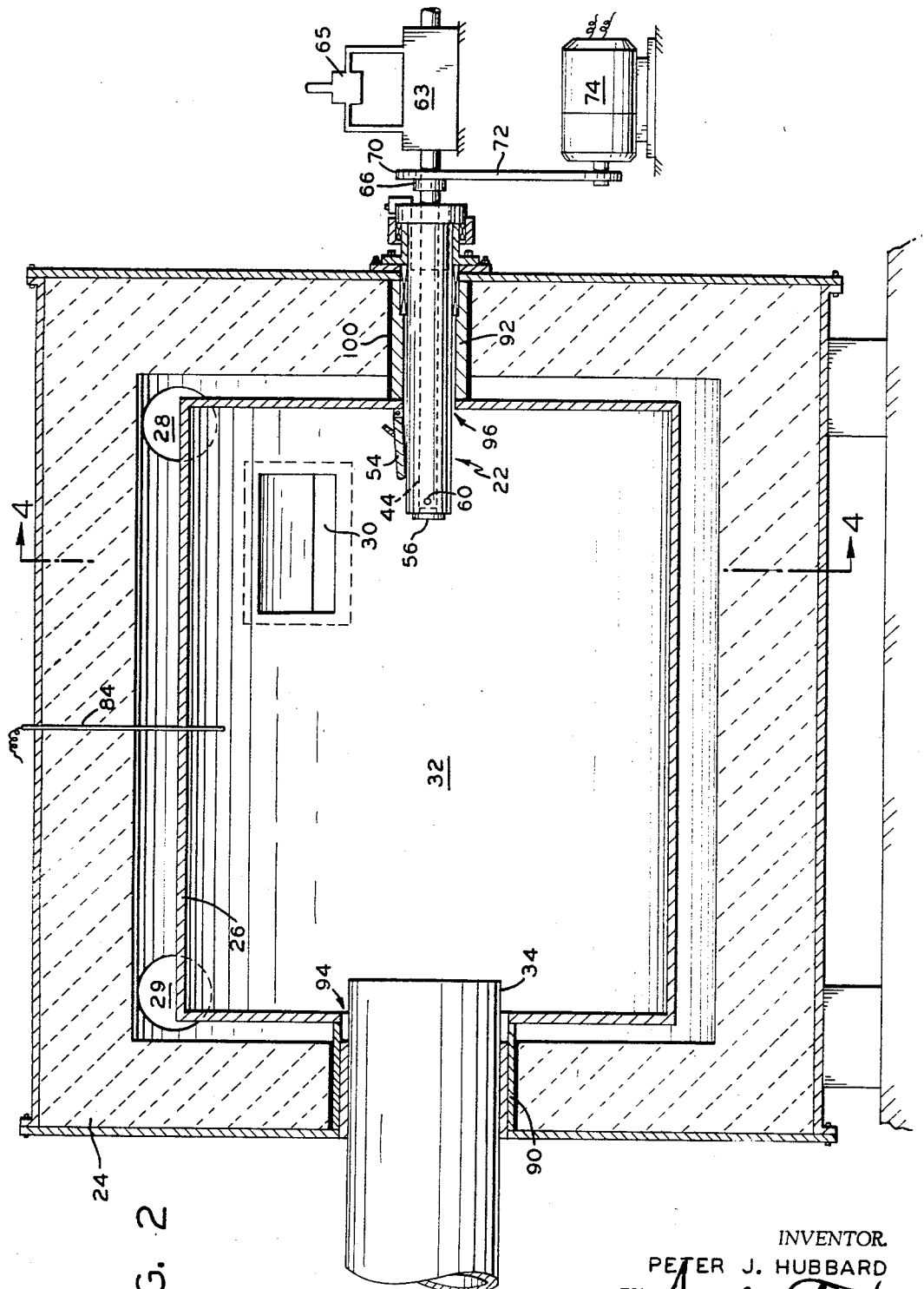

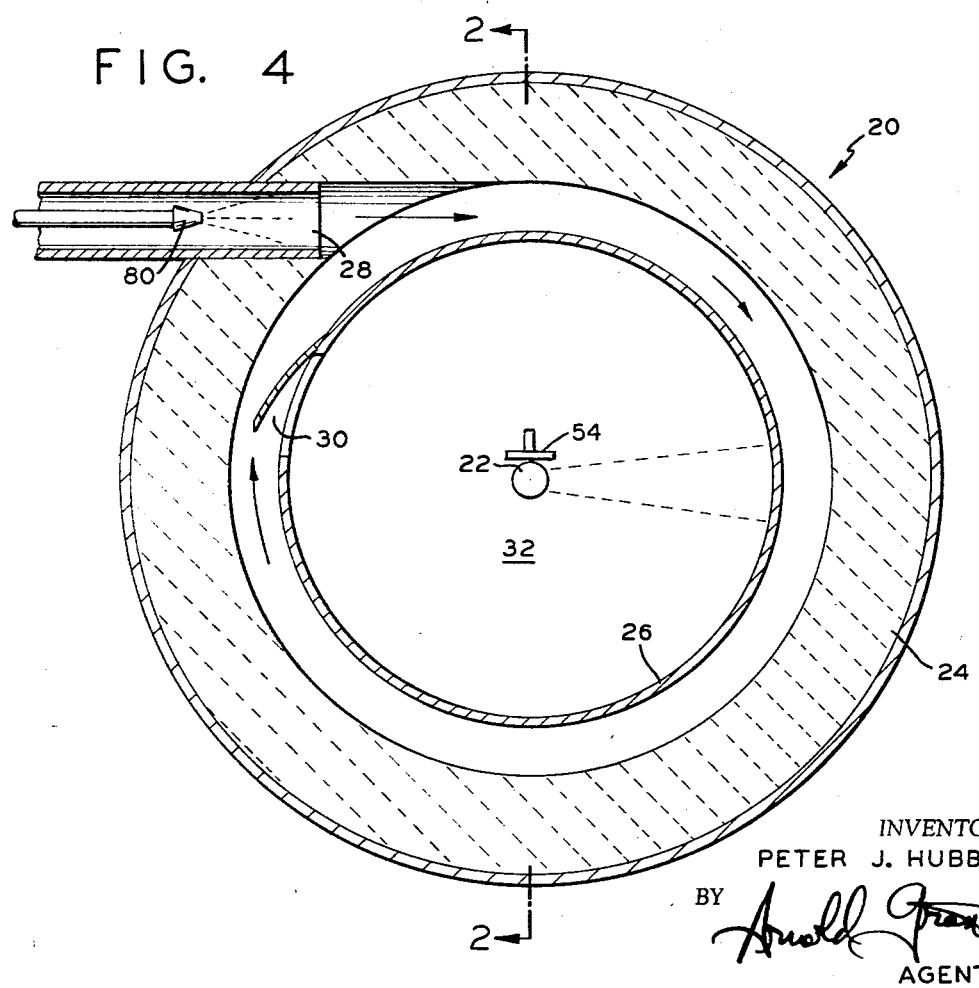

United States Patent Office 3,396,680
Patented Aug. 13, 1968

3,396,680
THERMAL REACTORS
Peter J. Hubbard, Norwalk, Conn., assignor to Dorr-Oliver Incorporated, Stamford, Conn., a corporation of Delaware
Continuation-in-part of application Ser. No. 524,715, Feb. 3, 1966. This application Feb. 28, 1967, Ser. No. 619,478
19 Claims. (Cl. 110—8)

ABSTRACT OF THE DISCLOSURE

The present invention relates to improvements on the reactor disclosed in the above cited application. More particularly the present invention relates to an improved temperature control, a more efficient system control, a novel feed arrangement, and an improved support arrangement for the combustion chamber in the housing.

This application is a continuation-in-part of Ser. No. 524,715, filed Feb. 3, 1966.

In prior art thermal reactors the temperature in the combustion chamber is maintained at the desired operating level by adjustably controlling either the amount of auxiliary fuel injected into the reactor, or the rate at which the organic waste material is fed into the combustion chamber. In the present invention the temperature in the combustion chamber may be maintained and controlled by adjustably feeding fuel directly into the feed material before the feed material is introduced into the combustion chamber. This method of adjustably enhancing the fuel value of the feed material not only provides an intimate and rapid adjustment of the temperature in the combustion chamber but because the rate of feed is kept constant, the reactor, and any prior dewatering treatment of the feed material, may be maintained at their most efficient operating levels. In addition, the mixing of a liquid fuel with the feed material allows for easier handling and transfer of the feed to the combustion chamber due to the lubricating effect of the fuel.

In applicant's above cited application the amount of heat treatment received by a given batch of feed material, i.e., from drying, through the various stages of combustion, to complete volatilization and incineration, is controlled by adjusting the space rate of the combustion air and the temperature in the combustion chamber. The present invention provides a more efficient and simplified system control by providing an adjustable vortex finder as the discharge for the thermally reacted products of the combustion chamber. In this manner, the space rate and the temperature can also be maintained at their optimum operating level to further increase efficiency. The amount of heat treatment received by the feed material is now controlled by adjusting the relative position of the entrance to the exhaust outlet in the combustion chamber, which in turn adjustably controls the detention time of the feed material in the combustion chamber. The further the exhaust entrance extends into the combustion chamber the longer the feed material will be retained in the combustion chamber and the more complete will be the combustion and volatilization.

The continuous pumping of a substantially solid feed material often creates surges of back pressure which, if not carefully controlled, can result in a shearing of the discharge end of the feed nozzle. The present invention provides a novel feeding and nozzle arrangement which alleviates this problem by providing means to automatically equalize the forces on the end of the nozzle as back pressure is created, to thereby prevent the strain usually placed on the discharge end of the nozzle.

Applicant has further improved upon the cyclonic thermal reactor he disclosed in the above cited application by re-designing the combustion chamber and the support and heat expansion arrangement between the combustion chamber and the housing. In the present invention the combustion chamber is completely enclosed and is, in effect, suspended in the housing by two necked extensions at either end of the combustion chamber. Thus, heat loss from the thermal reactor is effectively diminished and the combustion chamber is free to expand in any direction without interfering with the walls of the housing.

It is, therefore, an object of the present invention to control the temperature in a thermal reactor by adjusting the fuel value of the feed material.

It is another object of the present invention to control the detention time of the feed material in a thermal reactor by means of a vortex finder.

It is a still further object of the present invention to provide means to equalize forces on the end of the feed nozzle.

Still another object of the present invention is to support a cyclonic thermal reactor from its feed and discharge ends.

The subject matter which applicant regards as his invention is particularly pointed out and distinctly claimed after the concluding portion of this specification. The invention, however, as to its organization and method of operation together with further objects and advantages thereof will best be understood by reference to the following description taken in conjunction with the accompanying drawings in which:

FIGURE 2 is a side elevational view of the thermal reactor embodying the present invention taken in section along the line 2—2 of FIGURE 4;

FIGURE 4 is a cross-sectional view of the thermal reactor embodying the present invention taken along the line 4—4 of FIGURE 2; and FIGURE 5 is a flow diagram showing diagrammatically the feeding and dewatering of organic waste material prior to its introduction to the thermal reactor, and the supplying of primary combustion air, secondary combustion air, and fuel.

Figure 1:
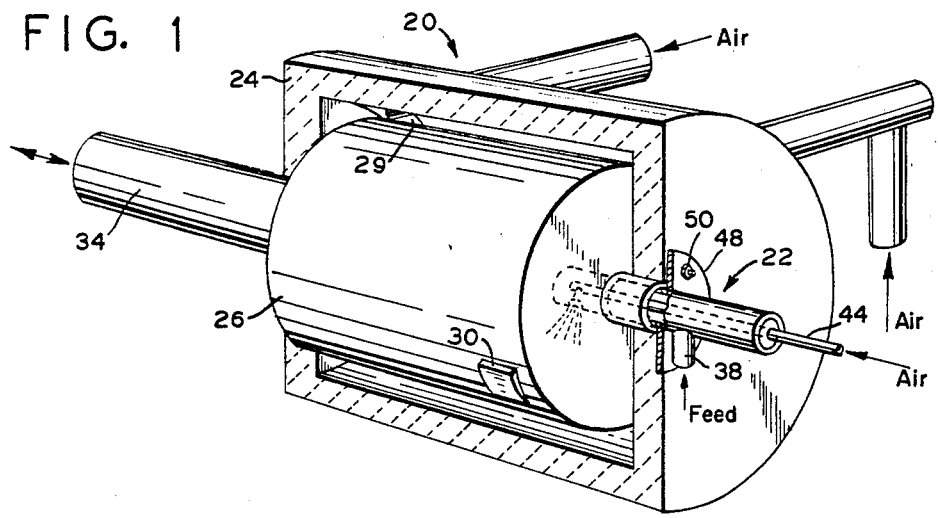
FIGURE 1 is a perspective view of the thermal reactor embodying the present invention with a section of the housing cut away to figuratively show the positioning of the entrance and exit ducts to and from the combustion chamber and housing.

Referring now to FIGURES 1 and 5, the cyclonic thermal reactor and combustion process of the instant invention will be briefly described. Organic waste material, which can, if desired, be mechanically dewatered by means such as a comminutor or grinder 10, a pump 12, and a centrifuge 14, is fed into a Moyno pump 16 for introduction into the cyclonic thermal reactor 20 through nozzle 22. The thermal reactor 20 has an outer housing 24 and an inner concentric shell 26. Primary combustion air, heated to around 2400° F., is fed into the thermal reactor through inlet 28 between the housing and the concentric shell 26. Secondary combustion air, to supply any additional oxygen needed is introduced into the thermal reactor, through inlet 29, which is also between the housing and the shell. The primary and secondary air, both of which are forced into the housing at relatively high speed, move around the shell in a circular or swirling motion transferring heat to the shell and bringing the shell up to temperature. The combustion air continues its circular pattern until it intercepts inlet 30 in the concentric shell and enters into the combustion chamber 32.

The high speed and relatively tangential entrance of the combustion gases creates a cyclonic effect in the combustion chamber which, as will be explained in greater detail below, swirls the feed material in a corkscrew motion along the walls of the shell.

Nozzle 22, which sprays the feed material into the combustion chamber 32 against the walls of the shell, is continuously rotating and oscillating along its longitudinal axis to prevent any buildup of caked feed material along the walls of the shell. The feed material, as soon as it enters the combustion chamber, is entrained in the cyclonic path of the combustion gases and begins to absorb heat from the gases. The entrained solids continue to absorb heat and wind their way toward the discharge end of the combustion chamber. As will be explained in greater detail below, the relative position of the exhaust tube 34 in the combustion chamber 32 determines the detention time and thus the degree of heat treatment received by the feed material. The treated resultant from the cyclonic thermal reactor may then, if desired, be further treated by separating means, such as a cyclone 36, to remove any entrained solids and the gases discharged to the atmosphere.

Figure 3:
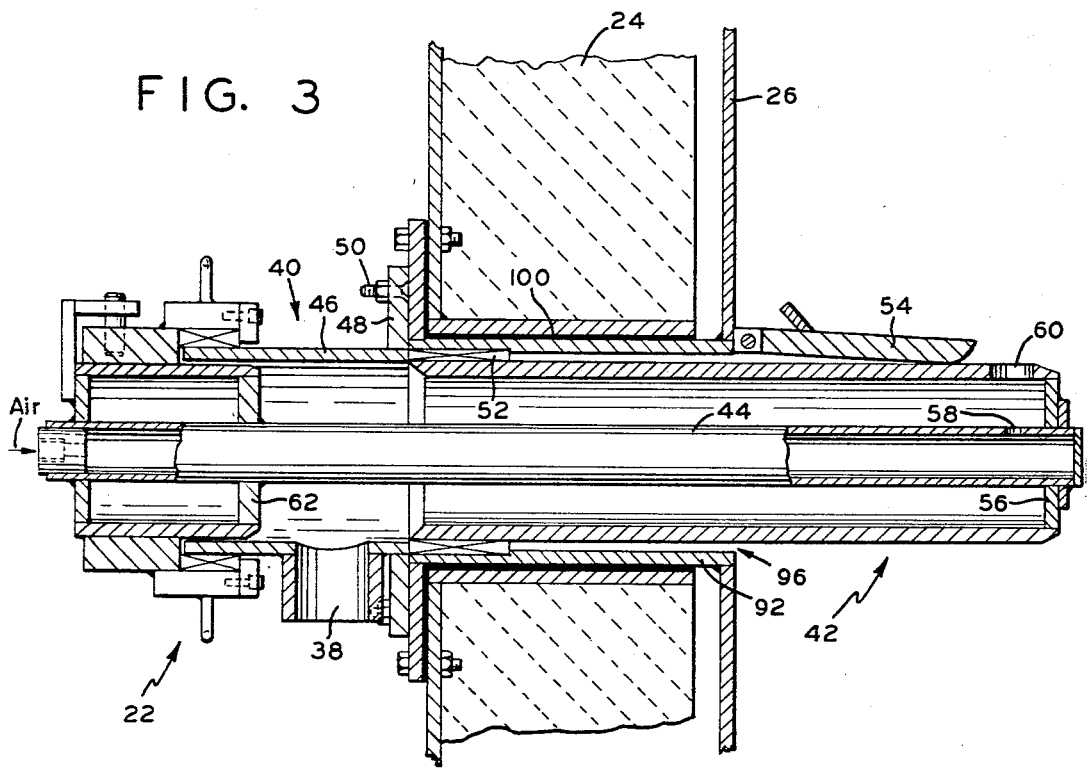
FIGURE 3 is an enlarged side elevational view in section of the novel feed arrangement and part of the thermal reactor embodying the present invention.

The feed material which is preferably at least 20% solids is discharged from the Moyno pump 16 into inlet 38 of nozzle 22. Nozzle 22 (FIGURE 3) has an outer section 40, an inner section 42 and a concentric rotatable compressed air conduit 44. Outer section 40 has an outer tube 46 which is rigidly connected to the housing 24 and shell 26 by means of welded flange 48 and bolts 50. The inner nozzle section 42 is removably and rotatably mounted in shell 26 by means of bearing assembly 52. A door 54 is pivotally mounted in shell 26 and bears up against inner nozzle section 42 to close off the combustion chamber 32 and thus retain the heat in the combustion chamber, if it is desired to remove the nozzle from the combustion chamber. Inner nozzle section 42 opens directly into outer nozzle section 40 at one end, to receive the feed material, and is closed at the other end by plate 56 which is fixedly connected to compressed air conduit 44 so as to rotate the inner nozzle section and the compressed air tube as a unit. The compressed air conduit has an opening 58 at its discharge end which is smaller than, and concentric with, an opening 60 in inner nozzle section 42 to spray the feed material out of the nozzle and against the walls of the combustion chamber.

A piston 62 is fixedly attached to the compressed air conduit 44 and is slideably received in fixed outer tube 46. Because the piston 62 is fixedly attached to the compressed air conduit 44 instead of the outer tube 46, the piston 62, compressed air conduit 44 and the end plate 56 can act as a unit. Thus any surges of back pressure which may result from the pumping of the substantially solid feed material will react equally in both directions, i.e., half on the end plate 56 and half on the piston 62, instead of just on the end plate. In this manner the forces on the end of the feed nozzle are continuously and automatically equalized in both directions and the possibility of a surge of back pressure resulting in end plate failure is effectively eliminated.

The air feed end (FIGURE 2) of compressed air conduit 44 is keyed to a yoke 66 which is in turn connected to a hydraulic cylinder 63 and to a sheave 70, pulley belt 72, and variable speed motor 74 to rotate and oscillate the compressed air conduit. Hydraulic cylinder 63 can be made to oscillate by any known means, such as a solenoid actuated 4-way valve 65. The lower nozzle section and the compressed air tube, which are connected by end plate 56 are rotated as a unit and oscillated along their longitudinal axis to prevent any chance of localized cooling and build-up of feed cake along the walls of the shell.

The shell 26 is constructed of heat resistant and heat conducting material, such as stainless steel and is concentrically positioned within the fire brick or other insulating material of housing 24. Primary combustion air, which may be pre-heated by passing it through heat exchange coils 76 around separating cyclone 36, is fed from pump 78 through inlet 28 into the space between the housing and the shell. A furnace gun 80 (FIGURE 4) supplied with fuel from conduit 82, is positioned within inlet 28 to heat the combustion air to the desired temperature, preferably 2400° F., before it is introduced into the thermal reactor.

Secondary combustion air, to supply any additional oxygen needed for complete combustion, may also be supplied from pump 78 and pre-heated in heat exchange coils 76 before it is fed into the space between the housing and the shell through inlet 29. The primary and secondary combustion air circumnavigates shell 26, transmitting heat to the shell, until it intercepts inlet 30 and enters into the combustion chamber 32. The high velocity and relatively tangential entrance of the gases into the combustion chamber creates a cyclone in the combustion chamber which immediately entrains the feed material as it is sprayed from nozzle 22.

The heat energy transmitted to the shell by the swirling combustion gases between the housing and the shell radiates inwardly through the shell to treat the heavier feed particles, trapped by their relative weight, along the inner wall of the shell. This enhances the efficiency of the combustion gases within the combustion chamber because the same heat energy is now moving in two directions, countercurrently to each other, to completely envelop and treat the entrained feed material. Heating the shell from both inside and out has the further advantage of preventing any localized cooling in the area where the feed material is sprayed into the combustion chamber. The intense heat transmitted to the shell will immediately vaporize the moisture content of any feed particle adhering to the shell, to bounce the particle off of the shell and into the entraining gases.

The entrained feed material continues its winding cyclonic path constantly moving longitudinally through the combustion chamber, until it encounters the closed discharge end of the chamber. At this point the entrained solids continue to move around the combustion chamber but they now take on the appearance of a whirling bed, i.e., intense and violent interaction between the entrained solids and gases, with the larger particles, at the outer reaches of the shell, being comminuted by the violent mixing and moving inwardly toward the center of the chamber.

Exhaust outlet 34 is adjustably positioned in the combustion chamber, opposite the feed nozzle 22, to discharge the gases and remaining entrained solids. The relative position of the exhaust outlet 34 in the combustion chamber determines the detention time of the feed particles in the chamber and thus the amount of heat treatment received by the feed particles. The further the entrance of the exhaust outlet extends into the combustion chamber the deeper will be the whirling bed and therefore the longer will be the detention time and the finer the discharge product. Thus the exhaust outlet serves, in effect, as an adjustable vortex finder for the cyclone in the combustion chamber, to vary the application of the cyclonic thermal reactor from that of just drying the feed material to a complete incineration of the feed material.

In any thermal reactor the temperature in the combustion chamber is critical, to efficiency, and, therefore, must be consistently maintained at the desired level. In prior art reactors the temperature is controlled by either adjusting the rate of auxiliary fuel flow to the reactor or by adjusting the rate of feed of the organic waste material into the combustion chamber. In the present invention the temperature in the combustion chamber is controlled by adjustably increasing or decreasing the fuel value of the feed material. As shown in FIGURE 5, a pyrometer 84 has one end positioned in the combustion chamber and its other end electrically connected to a fuel valve 86 which adjustably and automatically feeds fuel from fuel conduit 82 to the feed material in Moyno pump 16. In this manner, if for example, the temperature in the combustion chamber should drop below the desired operating level, the amount of fuel added to the feed material would be increased, as the feed material is introduced into the spray nozzle 22. This system not only provides a very intimate and rapid control of the temperature in the combustion chamber, but it also alleviates the inherent disadvantages of controlling temperature by adjusting the rate of feed to the combustion chamber. Relatively solid organic waste material is very difficult to pump, because of its tendency to bridge and gap. Any variations in the pumping rate only increases this tendency, which of itself can vary the feed rate and adversely effect the temperature in the combustion chamber. In addition, efficient utilization of the dewatering and combustion system requires that they be used to capacity; varying the feed rate thus reduces their efficiency, to say nothing of the problems involved in backing up the entire dewatering process. Another advantage of injecting fuel into the feed material is the lubricating effect it has on the feed material making it much easier to pump and to spray.

Because of the high temperatures to which the shell is subjected during the combustion process the thermal expansion of the shell relative to the housing is a critical problem. The present invention provides for thermal expansion with a two point support between the housing and the shell which allows for free movement of the shell in any direction. The feed and the discharge ends of the shell each have a necked extension 90 and 92 which is accepted into corresponding openings in the housing 94, 96. The expansion of the stainless steel of the shell relative to the fire brick of the housing is relatively slight in the support area so that the fit of the necked extensions 90, 92 can be fairly close to the openings 94, 96. A set of compressible annular seals 98, 100 between the necked extensions and the openings in the housing suffices to prevent any heat from escaping the area between the housing and the shell. Completely enclosing the combustion chamber also has the added advantage of preventing any heat loss from the combustion chamber regardless of the state of the combustion process, e.g., warm-up or shut-down, and regardless of the relative position of the shell vis-a-vis the housing.

As this invention may be embodied in several forms without departing from the spirit or essential character thereof, the present embodiment is illustrative and not restrictive. The scope of the invention is defined by the appended claims rather than by the description preceding them, and all embodiments which fall within the meaning and range of equivalency of the claims are, therefore, intended to be embraced by those claims.

I claim:

1. A thermal reactor for heat treating organic waste material comprising a longitudinally extending housing, a shell mounted within said housing in spaced relation thereto to provide an outer chamber between said housing and said shell, means to introduce combustion air into said chamber, inlet means in said shell to channel the combustion air from said outer chamber into said shell longitudinally extending, spray means having an end plate and a discharge opening at one end thereof to feed organic waste material under pressure into said spray means against said end plate and into said shell, means to rotate said spray means over a selected portion of said shell, means to equalize the forces on said end plate, and an exhaust outlet to discharge the thermally reacted products from said shell.

2. A thermal reactor as defined in claim 1, wherein said force equalizing means comprises a piston in said spray means, said piston being fixedly attached to said end plate.

3. A thermal reactor as defined in claim 1, wherein said spray means comprises a first tube to receive the organic feed material, a second tube in said first tube to discharge the feed material into said combustion chamber, and means slideably received in said first tube and fixedly attached to said second tube to equalize the forces on said end plate.

4. A thermal reactor as defined in claim 2 further including means in conjunction with said spray rotating means to continuously oscillate said spray means along its longitudinal axis.

5. A thermal reactor as defined in claim 1, wherein said exhaust outlet projects into said combustion chamber along a plane substantially parallel to the longitudinal axis of said combustion chamber to establish the location of a vortex which rotates the thermally reacted products around the axis of the vortex before discharging them from the combustion chamber, said outlet being longitudinally adjustable relative to said combustion chamber to vary the depth of the vortex and the position at which the thermally reacted products will discharge from said combustion chamber.

6. A thermal reactor as defined in claim 1, further including a source of fuel, feed means to adjustably inject the fuel into the organic waste material prior to the introduction of the organic waste material into said shell, and temperature sensing means in said thermal reactor to control the amount of fuel injected by said feed means into the organic waste material in relation to the temperature in said thermal reactor.

7. A thermal reactor as defined in claim 1, wherein said shell has at least one longitudinally extending necked portion, and said housing has at least one corresponding opening to receive said necked portion and support said shell in spaced relation to said housing.

8. A thermal reactor for heat treating sludge comprising a longitudinally extending housing, a shell of heat conducting material mounted within said housing in spaced relation thereto to provide an outer chamber between said housing and said shell, at least one conduit to supply hot combustion gases from burning fuel and combustion air to said outer chamber, inlet means in said shell to channel the combustion gases from said outer chamber into said shell, means at one end of said shell to feed organic waste material into said shell, and an exhaust conduit extending into said combustion chamber to establish the location of a vortex which rotates the thermally reacted products around the axis of the vortex before discharging them from the combustion chamber, said conduit being adjustable relative to said chamber to vary the depth of the vortex and the position at which the thermally reacted products will discharge from the combustion chamber, said thermal reactor further including temperature sensing means in the reactor and means to adjustably feed fuel to the sludge before the sludge is introduced into said thermal reactor, in relation to a signal from said temperature sensing means.

9. A thermal reactor for heat treating sludge comprising a longitudinally extending housing, a shell of heat conducting material mounted within said housing in spaced relation thereto to provide an outer chamber between said housing and said shell, at least one conduit to supply hot combustion gases from burning fuel and combustion air to said outer chamber, inlet means in said shell to channel the combustion gases from said outer chamber into said shell, means at one end of said shell to feed organic waste material into said shell, and an exhaust conduit extending into said combustion chamber to establish the location of a vortex which rotates the thermally reacted products around the axis of the vortex before discharging them from the combustion chamber, said conduit being adjustable relative to said chamber to vary the depth of the vortex and the position at which the thermally reacted products will discharge from the combustion chamber, said shell having a longitudinally extending necked portion at each end thereof, and said housing having openings therein to receive said necked portions, said necked portions and said openings thus supporting and maintaining said shell in spaced relation to said housing.

10. A thermal reactor for heat treating sludge comprising a longitudinally extending housing, a shell of heat conducting material mounted within said housing in spaced relation thereto to provide an outer chamber between said housing and said shell, at least one conduit to supply hot combustion gases from burning fuel and combustion air to said outer chamber, inlet means in said shell to channel the combustion gases from said outer chamber into said shell, means at one end of said shell to feed organic waste material into said shell, and an exhaust conduit extending into said combustion chamber to establish the location of a vortex which rotates the thermally reacted products around the axis of the vortex before discharging them from the combustion chamber, said conduit being adjustable relative to said chamber to vary the depth of the vortex and the position at which the thermally reacted products will discharge from the combustion chamber, said means to feed sludge into said shell being rotatable over selected areas of said shell and having means therein to equalize the force of back pressure from the sludge.

11. A thermal reactor as defined in claim 8, further including means to rotate said sludge feed means over selected areas of said shell, and means at one end of said feed means to equalize the forces of back pressure in said feed means.

12. A thermal reactor as defined in claim 8, wherein said shell has a longitudinally extending necked portion at each end thereof, and said housing has corresponding openings to receive said necked portions, said sludge feed means entering said shell through one of said necked portions.

13. A thermal reactor as defined in claim 9, further including means in said feed means to equalize the forces of back pressure from the sludge.

14. A thermal reactor as defined in claim 13, further including temperature sensing means in said shell and means to inject fuel into said sludge in response to a signal from said temperature sensing means.

15. A thermal reactor for heat treating organic waste material comprising a longitudinally extending housing, a shell mounted within said housing in spaced relation thereto to provide an outer chamber between said housing and said shell, means to introduce combustion air into said chamber, inlet means in said shell to channel the combustion air from said outer chamber into said shell, spray means having a discharge at one end thereof to feed organic waste material into said shell, an exhaust outlet to discharge the thermally reacted products from said shell, temperature sensing means in said combustion chamber, and means to adjustably supplement the fuel value of the organic waste material in response to a signal from said temperature sensing means.

16. A thermal reactor as defined in claim 15, wherein said last mentioned means comprises a source of fuel and means to adjustably vary the feed of the fuel into the organic waste material in response to signals from said temperature sensing means.

17. A thermal reactor as defined in claim 16, wherein the fuel is in liquid form when it is fed into the organic waste material.

18. A thermal reactor as defined in claim 15, wherein said exhaust means extends into said combustion chamber to establish the location of a vortex which rotates the thermally reacted products from said combustion chamber, said exhaust means being longitudinally adjustable relative to said combustion chamber to vary the depth of the vortex and the detention time of the organic waste material in said combustion chamber.

19. A thermal reactor for heat treating organic waste material comprising a longitudinally extending housing, a shell of heat conducting material within said housing in spaced relation thereto to provide an outer chamber between said housing and said shell, inlet means along the longitudinal axis of said housing to introduce combustion air into said chamber, inlet means in said shell to channel the combustion air from said outer chamber into said shell, said shell having a longitudinally extending necked portion at either end thereof, corresponding openings in said housing to receive said necked portions and thereby support said shell in said housing and allow for thermal expansion of said shell relative to said housing, means to feed organic waste material into said shell, said means entering said shell through one of said necked portions, and exhaust means to discharge the thermally reacted products from said shell, said exhaust means entering the shell through the other of said necked portions.

References Cited

UNITED STATES PATENTS

| | | |
|---|---|---|
| 255,925 | 4/1882 | Breer. |
| 562,158 | 6/1896 | Sears. |
| 1,995,723 | 3/1935 | Van Denburg _____ 110—8 |
| 2,292,571 | 8/1942 | Komline _____ 110—8 |
| 2,822,038 | 2/1958 | Kennedy et al. _____ 110—7 X |

JAMES W. WESTHAVER, *Primary Examiner.*